US010870361B2

United States Patent
Hara et al.

(10) Patent No.: US 10,870,361 B2
(45) Date of Patent: Dec. 22, 2020

(54) VEHICLE STRUCTURE OF FUEL CELL VEHICLE

(71) Applicant: Toyota Jidosha Kabushiki Kaisha, Toyota (JP)

(72) Inventors: Yasuhiro Hara, Nagoya (JP); Mikio Inoue, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/539,304

(22) Filed: Aug. 13, 2019

(65) Prior Publication Data

US 2020/0062135 A1 Feb. 27, 2020

(30) Foreign Application Priority Data

Aug. 21, 2018 (JP) .................................. 2018-154937

(51) Int. Cl.
*B60L 50/71* (2019.01)
*H01M 8/04828* (2016.01)
*H01M 8/04082* (2016.01)

(52) U.S. Cl.
CPC ........... *B60L 50/71* (2019.02); *H01M 8/0494* (2013.01); *H01M 8/04201* (2013.01); *H01M 2250/20* (2013.01)

(58) Field of Classification Search
CPC ...... B60L 50/71; B60L 50/72; H01M 8/0494; H01M 8/04201; H01M 2250/20; B60K 15/07
See application file for complete search history.

(56) References Cited

U.S. PATENT DOCUMENTS

| 6,367,573 | B1 * | 4/2002 | Scott | ................ | B60K 15/03006 |
| | | | | | 137/267 |
| 6,412,588 | B1 * | 7/2002 | Scott | .................... | B60K 15/013 |
| | | | | | 137/267 |
| 6,502,660 | B1 * | 1/2003 | Scott | .................... | B60K 15/013 |
| | | | | | 137/267 |
| 7,882,587 | B2 * | 2/2011 | Tagliaferri | ............. | B60K 15/07 |
| | | | | | 15/84 |

(Continued)

FOREIGN PATENT DOCUMENTS

| DE | 19926607 A1 | 12/2000 |
| DE | 112006000144 B4 | 12/2016 |

(Continued)

*Primary Examiner* — John D Walters
*Assistant Examiner* — James J Triggs
(74) *Attorney, Agent, or Firm* — Dinsmore & Shohl LLP (57) ABSTRACT

A vehicle structure of a fuel cell vehicle including: hydrogen tanks; a set of cases that house the hydrogen tanks at a roof side and an underfloor side respectively, and that respectively have, in a vehicle longitudinal direction, mouthpieces of a connecting pipe that is connected to the hydrogen tanks; a center module in which the set of cases is provided; a front module that is joined to a vehicle front side of the center module; a rear module that is joined to a vehicle rear side of the center module; a fuel cell stack that is provided at the front module or the rear module, and to which the hydrogen is supplied from a pipe connected to the mouthpieces; a control unit that is provided at the front module or the rear module; and a driving unit that is provided at the front module or the rear module.

6 Claims, 9 Drawing Sheets

(56) References Cited

U.S. PATENT DOCUMENTS

| | | | |
|---|---|---|---|
| 10,124,665 B2* | 11/2018 | Van Der Linden | B62D 35/001 |
| 10,696,155 B2* | 6/2020 | Sloan | B60K 15/04 |
| 10,710,490 B2* | 7/2020 | Crespo | B60K 6/00 |
| 2008/0115998 A1* | 5/2008 | Naganuma | B60H 1/00371 |
| | | | 180/314 |
| 2008/0156809 A1 | 7/2008 | Mizuno et al. | |
| 2009/0261107 A1 | 10/2009 | Allgeier et al. | |
| 2012/0280481 A1* | 11/2012 | Gentry | B60J 7/1607 |
| | | | 280/834 |
| 2014/0061266 A1* | 3/2014 | Milton | B60K 15/03006 |
| | | | 224/404 |
| 2014/0069972 A1* | 3/2014 | Willemsen | B60R 9/06 |
| | | | 224/401 |
| 2014/0375043 A1 | 12/2014 | Finck | |
| 2016/0207418 A1 | 7/2016 | Bergstrom et al. | |
| 2017/0299769 A1* | 10/2017 | Ohmi | G01V 11/002 |

FOREIGN PATENT DOCUMENTS

| | | |
|---|---|---|
| JP | 2009-018803 A | 1/2009 |
| WO | 2007-074098 A1 | 7/2007 |

* cited by examiner

VEHICLE STRUCTURE OF FUEL CELL VEHICLE

CROSS-REFERENCE TO RELATED APPLICATION

This application is based on and claims priority under 35 USC 119 from Japanese Patent Application No. 2018-154937 filed on Aug. 21, 2018, the disclosure of which is incorporated by reference herein.

BACKGROUND

Technical Field

The present disclosure relates to a vehicle structure of a fuel cell vehicle.

Related Art

International Publication No. 2007/074098 discloses a fuel cell vehicle in which hydrogen tanks are disposed at plural positions of a vehicle. In this fuel cell vehicle, hydrogen tanks of different sizes are disposed at plural places in order to ensure the vehicle cabin space.

In a fuel cell vehicle such as that described above, there is room for improvement with regard to using common hydrogen tanks and modularizing the vehicle.

SUMMARY

An object of the present disclosure is to provide a vehicle structure of a fuel cell vehicle that can ensure a wide vehicle cabin space while using common hydrogen tanks and modularizing the vehicle.

A vehicle structure of a fuel cell vehicle of a first aspect has: hydrogen tanks that are disposed at a roof side and an underfloor side of a vehicle cabin, and that are filled with hydrogen; a set of cases that house the hydrogen tanks at the roof side and the underfloor side respectively, and that respectively have, in a vehicle longitudinal direction, mouthpieces of a connecting pipe that is connected to the hydrogen tanks; a center module in which the set of cases is provided; a front module that is joined to a vehicle front side of the center module; a rear module that is joined to a vehicle rear side of the center module; a fuel cell stack that is provided at the front module or the rear module, and to which the hydrogen is supplied from a pipe connected to the mouthpieces; a control unit that is provided at the front module or the rear module, and that controls outputted electric power of the fuel cell stack; and a driving unit that is provided at the front module or the rear module, and that drives driving wheels by outputted electric power of the control unit.

In the vehicle structure of a fuel cell vehicle of the first aspect, the hydrogen tanks and the cases that house the hydrogen tanks are used in common. Because mouthpieces are provided at the vehicle longitudinal direction both ends of the cases, at the center module where the cases are disposed, pipes can be brought-out to both the front module and the rear module. Due thereto, the fuel cell stack can be disposed at either of the front module or the rear module. Further, respective devices such as the control unit and the driving unit also are disposed at the front module or the rear module. Due thereto, in accordance with the vehicle structure of the first aspect, a wide vehicle cabin space can be ensured while utilizing common hydrogen tanks and modularizing the vehicle.

In a vehicle structure of a fuel cell vehicle of a second aspect, positions, in the vehicle longitudinal direction, of extended portions, which extend in a vehicle vertical direction, of the pipes are within a range between a front end and a rear end of a wheel.

In accordance with the vehicle structure of a fuel cell vehicle of the second aspect, in a case in which the vehicle is collided-with from the side, the wheels receive the impact load. Therefore, the structure for protecting the pipes can be simplified.

In a vehicle structure of a fuel cell vehicle of a third aspect, high-voltage parts including the fuel cell stack, the control unit and the driving unit are provided at one of the front module or the rear module, and the vehicle structure further has an autonomous driving unit that controls autonomous driving of the vehicle, at another of the front module or the rear module.

In the vehicle structure of a fuel cell vehicle of the third aspect, the autonomous driving unit that relates to autonomous driving is set so as to be apart from the fuel cell stack, the control unit and the driving unit that are motive power parts through which high-voltage current flows. Namely, in accordance with the vehicle structure of the third aspect, influence of electromagnetic noise, generated from the motive power parts, on the autonomous driving unit can be reduced.

In accordance with the present disclosure, a wide cabin space can be ensured while utilizing common hydrogen tanks and modularizing the vehicle.

BRIEF DESCRIPTION OF THE DRAWINGS

Exemplary embodiments of the present disclosure will be described in detail based on the following figures, wherein.

DETAILED DESCRIPTION

Fuel cell vehicles relating to embodiments of the present disclosure are described by using the drawings. Note that, in the respective drawings, arrow FR indicates the vehicle front side, arrow UP indicates the vehicle upper side, arrow LH indicates the vehicle transverse direction left side, and arrow RH indicates the vehicle transverse direction right side.

First Embodiment

Structure

Figure 1:
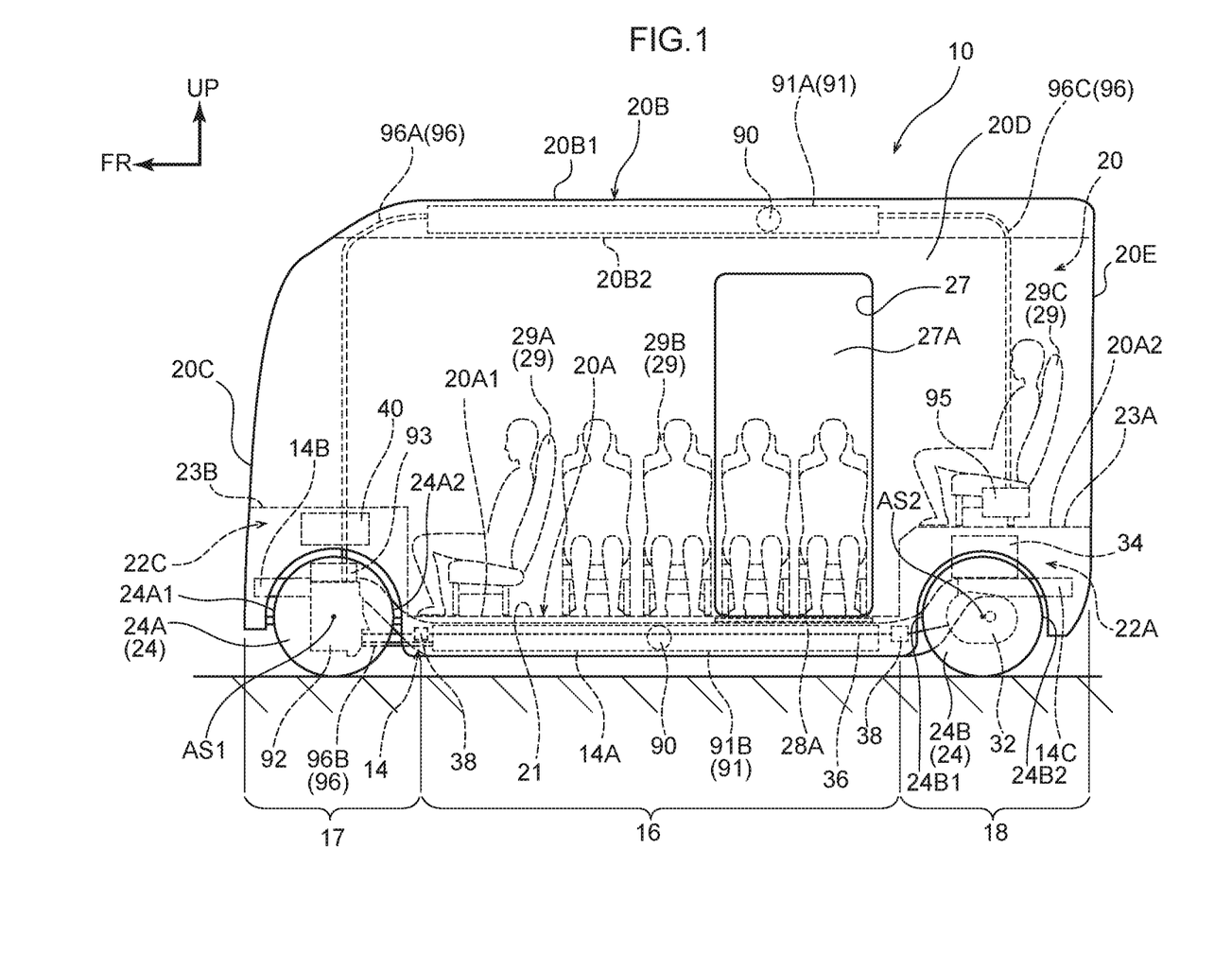
FIG. 1 is a side view of a fuel cell vehicle relating to a first embodiment.
Figure 2:
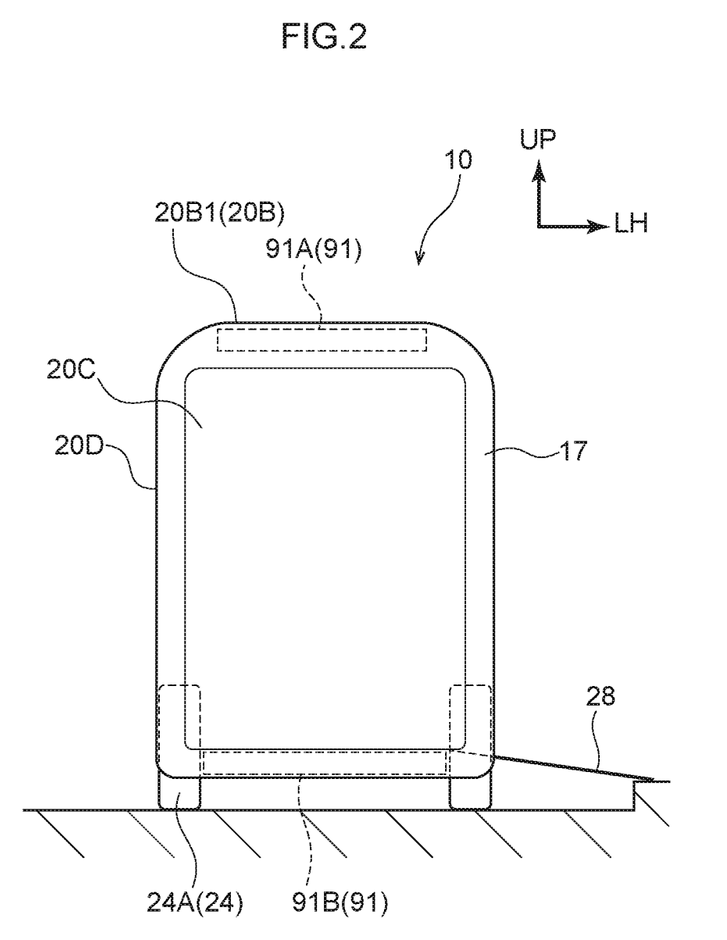
FIG. 2 is a front view of the fuel cell vehicle relating to the first embodiment.

A vehicle 10 of the present embodiment is a fuel cell vehicle at which completely autonomous driving is possible. As shown in FIG. 1 and FIG. 2, the exterior of the vehicle 10 is a substantially rectangular parallelepiped shape that is enclosed by a roof 20B, a front wall portion 20C, side wall portions 20D and a rear wall portion 20E. Among wheels 24, front wheels 24A are provided at the vehicle front side, and, among the wheels 24, rear wheels 24B are provided at the vehicle rear side.

Figure 3:
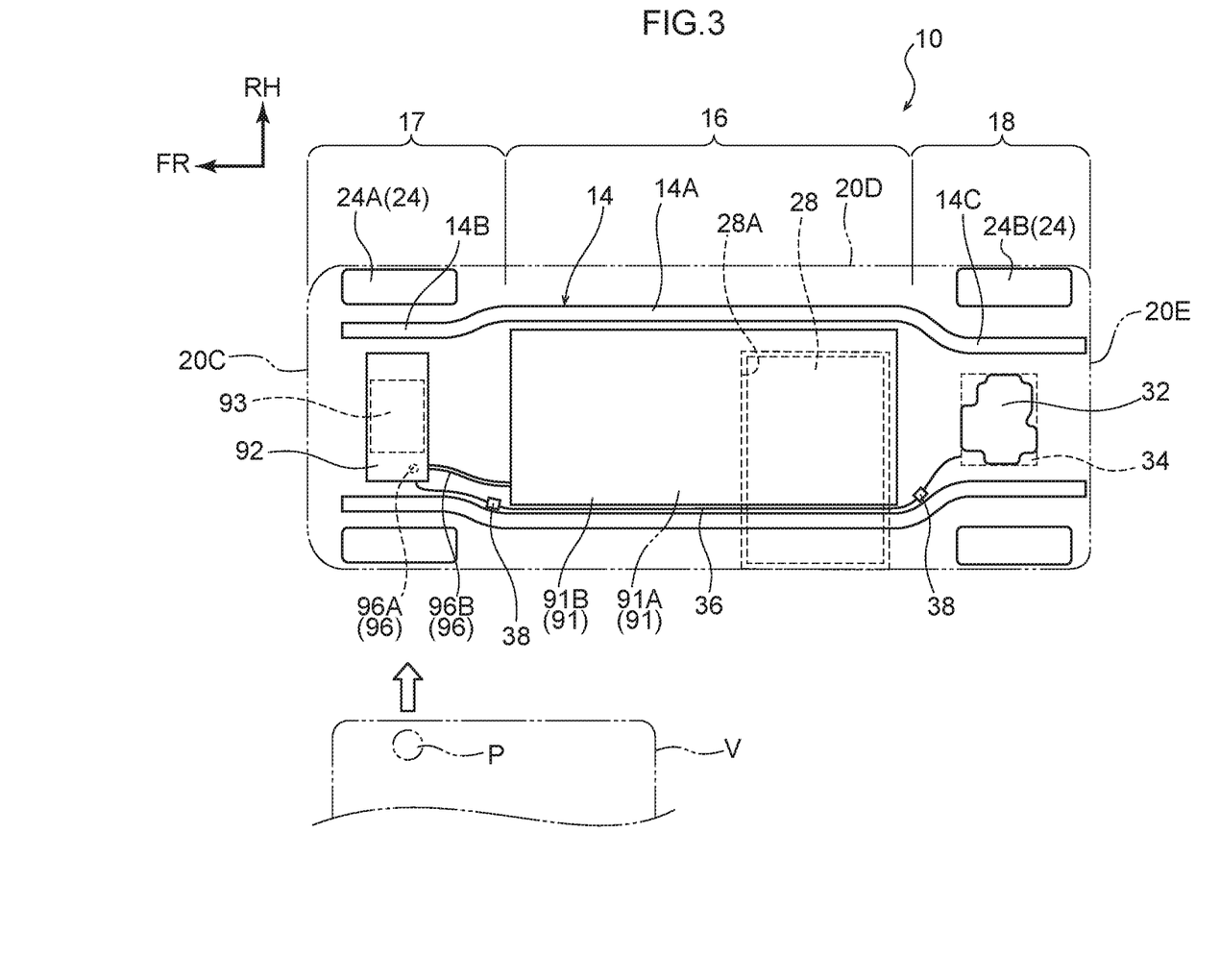
FIG. 3 is a plan sectional view of the fuel cell vehicle relating to the first embodiment.

The vehicle 10 of the present embodiment is structured by plural modules being joined together. As shown in FIG. 1 and FIG. 3, the vehicle 10 is structured to include a center module 16 that structures the vehicle longitudinal direction central portion, a front module 17 that is joined to the vehicle front side of the center module 16, and a rear module 18 that is joined to the vehicle rear side of the center module 16. The front module 17 and the center module 16 are divided with the border therebetween being a portion that is slightly toward the vehicle rear side of the front wheels 24A. The center module 16 and the rear module 18 are divided with the border therebetween being a portion that is slightly toward the vehicle front side of the rear wheels 24B. Here, in the following description, in the longitudinal direction direction of the vehicle 10, the portion where the front module 17 exists is considered to be the vehicle front portion, the portion where the center module 16 exists is considered to be the vehicle central portion, and the portion where the rear module 18 exists is considered to be the vehicle rear portion (the same holds for the other embodiments as well).

Note that the center module 16, the front module 17 and the rear module 18 may respectively be modules that structure only the vehicle lower side. The vehicle 10 in this case is formed by further joining a roof module that structures the vehicle upper side to the center module 16, the front module 17 and the rear module 18 that are joined together.

Figure 4:
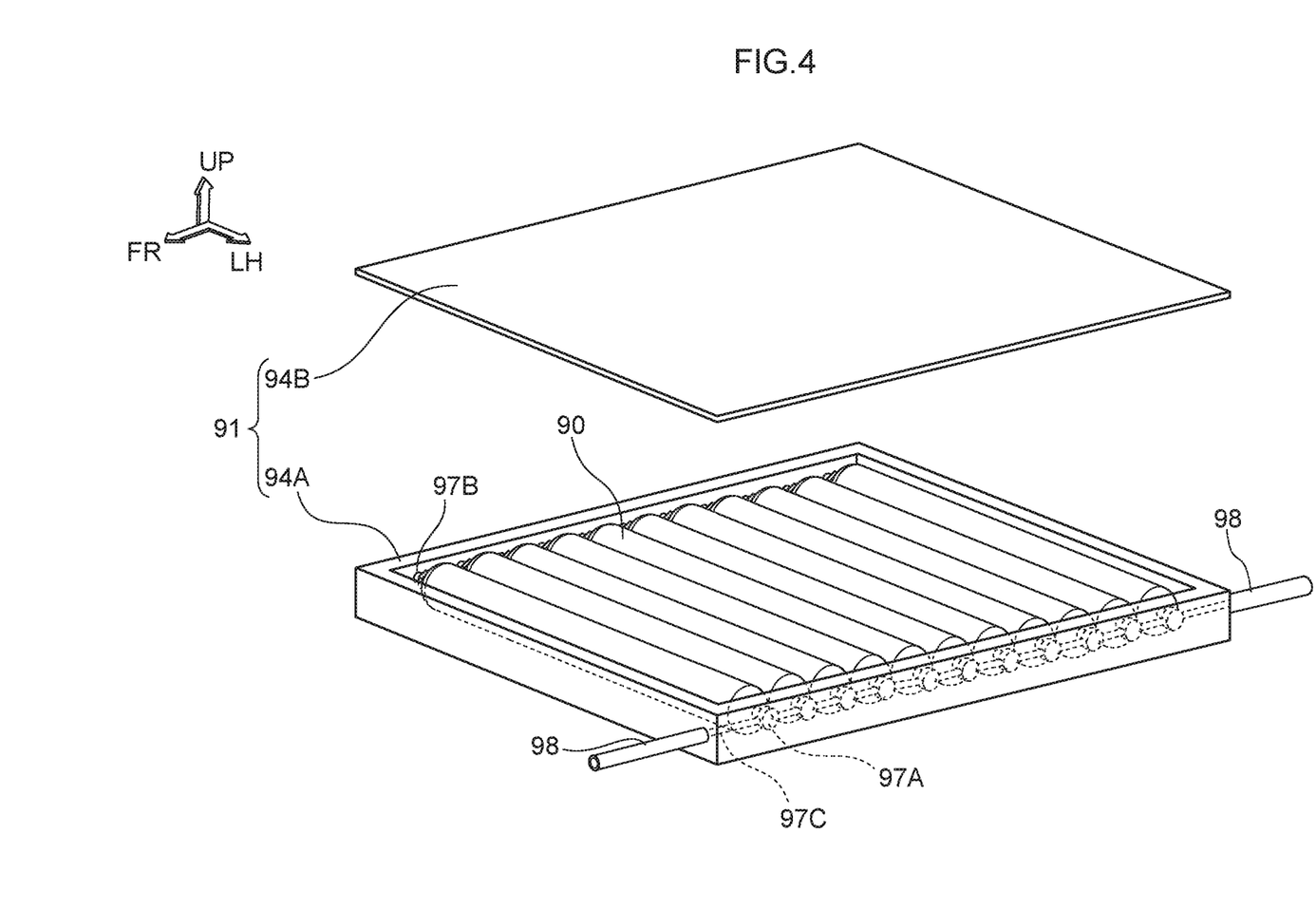
FIG. 4 is a perspective view of hydrogen tanks and a hydrogen tank case of the fuel cell vehicle relating to the first embodiment.

The center module 16 is structured to include the vehicle longitudinal direction central portions of the side wall portions 20D, and hydrogen tank cases 91 (see FIG. 4). Note that, in the present embodiment, plural types of center modules 16 having different lengths in the vehicle longitudinal direction are readied.

The front module 17 is structured to include the front wall portion 20C, time vehicle front portions of the side wall portions 20D, an autonomous driving unit 40, a fuel cell stack 92, and a secondary battery 93.

The rear module 18 is structured to include the rear wall portion 20E, the vehicle rear portions of the side wall portions 20D, a driving unit 32, and a power unit 34.

A pair of side members 14 that extend in the vehicle longitudinal direction are provided at the vehicle lower portion of the vehicle 10. The side member 14 has a center side member 14A, which extends from the vehicle rear portion of the front wheel 24A to the vehicle front portion of the rear wheel 24B, and a front side member 14B that is bent toward the vehicle transverse direction inner side and the vehicle upper side from the center side member 14A, and thereafter, extends toward the vehicle front. Further, the side member 14 has a rear side member 14C that is bent toward the vehicle transverse direction inner side and the vehicle upper side from the center side member 14A, and thereafter, extends toward the vehicle rear. Note that the center side members 14A are provided at the center module 16, the front side members 14B are provided at the front module 17, and the rear side members 14C are provided at the rear module 18.

A front axle that supports the front wheels 24A is fixed to the front side members 14B. The driving unit 32 for driving the rear wheels 24B that are the driving wheels is fixed to the rear side members 14C.

As shown in FIG. 1, the vehicle 10 has a power unit chamber 22A in which the driving unit 32 is housed, and a sub-unit chamber 22C in which the fuel cell stack 92 is housed. The vehicle 10 has a vehicle cabin 20 that is partitioned-off from the power unit chamber 22A and the sub-unit chamber 22C by dash panels 23A, 23B. The power unit chamber 22A of the present embodiment is the portion at the vehicle lower side of the vehicle rear portion, and is provided as a space of a range that surrounds the rear wheels 24B as seen in a side view. Further, the sub-unit chamber 22C is the portion at the vehicle lower side of the vehicle front portion, and is provided as a space of a range that surrounds the front wheels 24A as seen in a side view.

In addition to the fuel cell stack 92, the secondary battery 93 is housed in the sub-unit chamber 22C. The fuel cell stack 92 is a unit that includes plural fuel battery cells and a hydrogen pump. Further, the secondary battery 93 supplements the electric power of the fuel cell stack 92 when the vehicle 10 accelerates, and stores electric power that is regenerated when the vehicle 10 decelerates. The fuel cell stack 92 is connected to hydrogen tanks 90 that are described later by hydrogen pipes 96 that are pipes.

Figure 5:
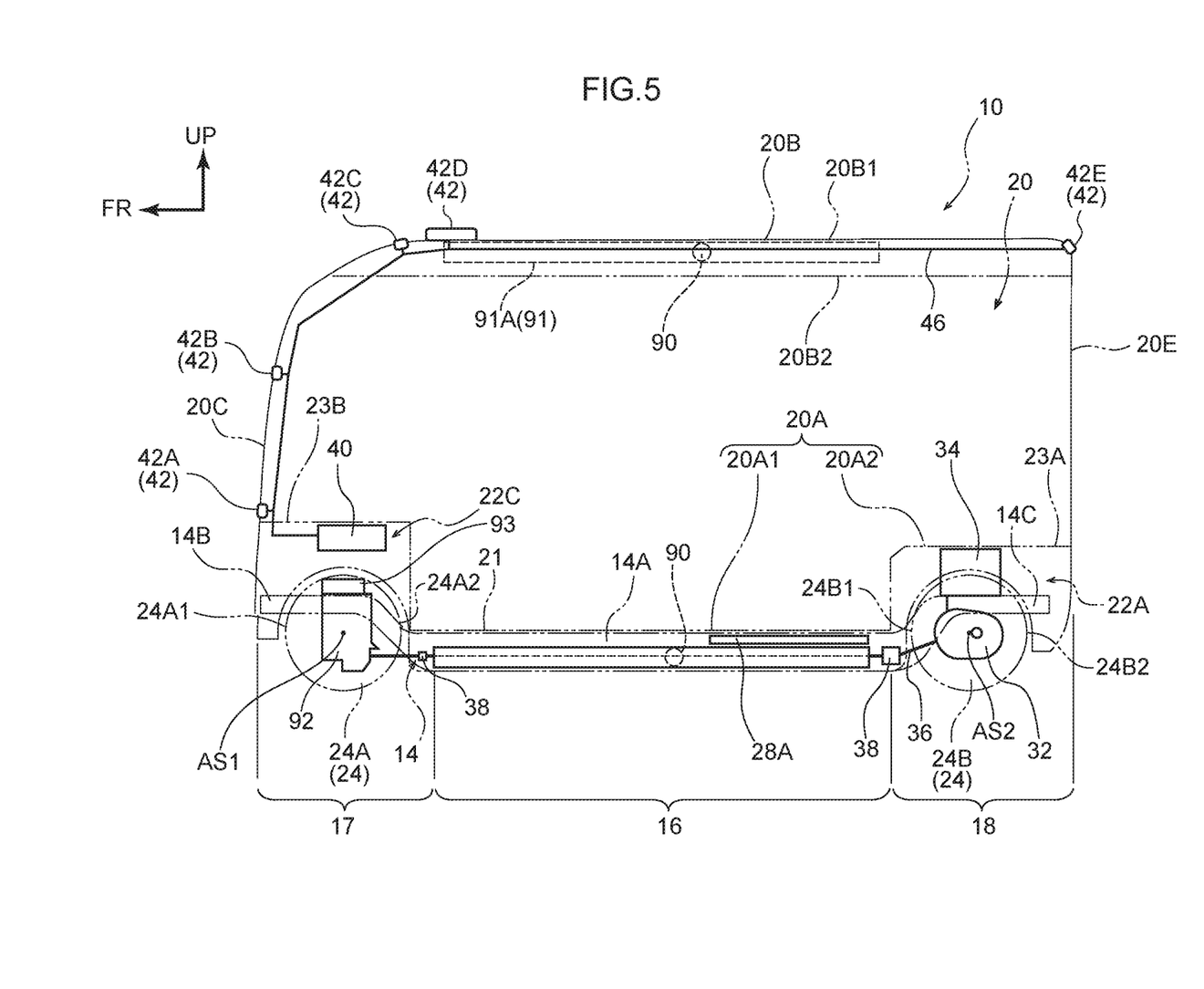
FIG. 5 is a side sectional view of the fuel cell vehicle relating to the first embodiment, and is a drawing explaining devices relating to autonomous driving.

The autonomous driving unit 40 that serves as an autonomous driving unit is housed in the sub-unit chamber 22C. The autonomous driving unit 40 is structured to include an autonomous driving ECU that controls the autonomous driving of the vehicle 10, an interface ECU that controls the communication between the steering unit and the acceleration/deceleration unit, and the like. As shown in FIG. 5, plural sensors 42 that acquire the situation at the periphery of the vehicle 10 are connected to the autonomous driving unit 40. These sensors 42 include cameras that capture images of predetermined ranges, millimeter wave radar that transmits survey waves over a predetermined range, and LIDAR (Light Detection and Ranging/Laser Imaging Detection and Ranging) that scans a predetermined range. Note that the fuel cell stack 92, the secondary battery 93, the hydrogen pipes 96, a side entrance/exit 27, and the like are omitted from FIG. 5.

As shown in FIG. 5, the sensors 42 include front portion sensors 42A, 42B that are provided at the front surface of the vehicle 10, upper portion sensors 42C, 42D that are provided at the vehicle front side portion of the upper surface of the roof 20B, and a rear portion sensor 42E that is provided at the end portion of the roof 20B at the vehicle rear side. The respective sensors 42 and the autonomous driving unit 40 are connected by a signal cable 46 that serves as a wire. Note that a camera is disposed at at least one of the front portion sensors 42A, 42B that are at the vehicle front side and the upper portion sensor 42C, in order to identify the statuses of traffic lights that are on the traveling route. For example, the front portion sensor 42B is a camera.

The signal cable 46, which extends from the autonomous driving unit 40 toward the vehicle upper side, is, midway therealong, connected to the front portion sensors 42A, 42B and the upper portion sensor 42C, and thereafter, is connected to the upper portion sensor 42D. The signal cable 46 extends from the upper portion sensor 42D toward the vehicle rear side and is connected to the rear portion sensor 42E. Here, at the roof 20B side, the signal cable 46 is disposed along the vehicle longitudinal direction between an outer panel 20B1 and an inner panel 20B2 that structure the roof 20B.

As shown in FIG. 1, in addition to the driving unit 32, the power unit 34 that serves as a high-voltage part is housed in the power unit chamber 22A. At the driving unit 32, at least a motor for traveling and a transaxle are made into a unit. Further, at the power unit 34, at least a boost converter and an inverter are made into a unit. The power unit 34 is electrically connected to the fuel cell stack 92 by a power cable 36. The power cable 36 is disposed along the vehicle longitudinal direction in the gap between the hydrogen tank case 91 and the center side member 14A (see FIG. 3). Note that power connectors 38 are provided at the power cable 36, at the joined portion of the center module 16 and the front module 17, and at the joined portion of the center module 16 and the rear module 18, respectively.

The region, which is further toward the vehicle rear side and the vehicle upper side than the sub-unit chamber 22C and which is further toward the vehicle front side and the vehicle upper side than the power unit chamber 22A, is the vehicle cabin 20 that is a substantially rectangular parallelepiped space. At the vehicle cabin 20 of the present embodiment, a floor surface 20A is formed by the dash panel 23B that is provided at the vehicle front portion and surrounds the sub-unit chamber 22C, a floor panel 21 that is provided at the vehicle central portion, and the dash panel 23A that is provided at the vehicle rear portion and surrounds the power unit chamber 22A. The floor surface 20A has a low floor portion 20A1 that is formed by the floor panel 21, and high floor portions 20A2 that are formed by the dash panels 23A, 23B and that are at positions higher than the floor panel 21.

The low floor portion 20A1 is positioned further toward the vehicle lower side than axle AS1 of the front wheels 24A and axle AS2 of the rear wheels 24B. The vehicle cabin 20 is formed at a height at which the passengers can board the vehicle 10 while standing-up. Here, a dummy having the physique of a standard (average) adult, e.g., an AM 50 (50th percentile U.S. adult male) internationally standardized side crash dummy (World Side Impact Dummy: World SID), can be used as an example of the "passenger". Namely, the vehicle cabin 20 of the present embodiment has a height that is such that there is a clearance between the inner panel 20B2 and the head portion of an AM 50 dummy when the AM 50 dummy is in a standing state. Note that the example of the passenger is not limited to an AM 50 dummy, and can be another crash dummy or a model of a standard physique that is obtained statistically.

Further, plural seats 29 in which passengers can sit are provided in the vehicle cabin 20. The seats 29 of the present embodiment are one front row seat 29A that is set at the vehicle front of the vehicle cabin 20, plural middle row seats 29B that are set so as to be lined up at the vehicle rear side of the front row seat 29A, and one rear row seat 29C that is set at the upper portion of the power unit chamber 22A. The front row seat 29A and the middle row seats 29B are fixed to the floor panel 21, and the rear row seat 29C is fixed to the dash panel 23A. The front row seat 29A and the rear row seat 29C are set such that the passengers seated therein face toward the vehicle front side. Further, at least four of the middle row seats 29B are disposed at the vehicle transverse direction right side. The middle row seats 29B are set such that the passengers who are seated therein face toward the vehicle transverse direction left side. However, the present disclosure is not limited to this, and the middle row seats 29B may be set such that the passengers face toward the vehicle front side. Moreover, the respective seats 29 may be made able to rotate freely with the vehicle vertical direction being the axes of rotation.

The plural hydrogen tanks 90 are disposed respectively at the roof 20B side and the side beneath the floor (the vehicle lower side of the low floor portion 20A1) of the vehicle cabin 20 at the vehicle central portion. Note that, in FIG. 1, only one of the hydrogen tanks 90 is illustrated for each of the hydrogen tank case 91, and the other hydrogen tanks 90 are omitted. (The same holds for FIG. 5, FIG. 6, FIG. 8 and FIG. 9.) The plural hydrogen tanks 90 are housed in the hydrogen tank cases 91. The hydrogen tank cases 91 are an upper tank case 91A that is accommodated between the outer panel 20B1 and the inner panel 20B2, and a lower tank case 91B that is accommodated beneath the floor of the vehicle cabin 20, and, in further detail, at the vehicle lower side of the floor panel 21. The upper tank case 91A is fixed to at least either of the outer panel 20B1 and the inner panel 20B2. The lower tank case 91B is fixed to the pair of center side members 14A that are disposed at the vehicle central portion.

As shown in FIG. 4, the hydrogen tank case 91 is a container that is shaped as a box that is thin in the vehicle vertical direction, and is structured by a housing portion 94A and a cover portion 94B. The hydrogen tanks 90 that are tubular are housed within the hydrogen tank case 91. Eleven of the hydrogen tanks 90 are disposed so as to be lined-up in the vehicle longitudinal direction in the hydrogen tank case 91 of the present embodiment. The hydrogen tank 90 is formed by a sheet-shaped CFRP (carbon fiber reinforced plastic) being rolled-up and made into a tubular shape. Connectors 97A are formed at length direction one end sides (the vehicle transverse direction left sides) of the hydrogen tanks 90. Plugs 97B that close-off the respective hydrogen tanks 90 are provided at the vehicle transverse direction other end side (the vehicle transverse direction right side) of the hydrogen tank case 91. Further, a connecting pipe 97C is connected to the connectors 97A of the respective hydrogen tanks 90. Mouthpieces 98, which are connected to the respective end portions of the connecting pipe 97C, are provided so as to protrude-out at the vehicle longitudinal direction both sides of the hydrogen tank case 91.

As shown in FIG. 1, the hydrogen pipes 96 are connected to the hydrogen tank cases 91 at the mouthpieces 98 (see FIG. 4). The hydrogen pipes 96 include a first hydrogen pipe 96A that is connected to the vehicle front side of the upper tank case 91A, a second hydrogen pipe 96B that is connected to the vehicle front side of the lower tank case 91B, and a third hydrogen pipe 96C that is connected to the vehicle rear side of the upper tank case 91A. Note that the mouthpiece 98 that is at the vehicle rear side of the lower tank case 91B is closed-off.

The first hydrogen pipe 96A connects the upper tank case 91A and the libel cell stack 92. This first hydrogen pipe 96A supplies hydrogen that is within the hydrogen tanks 90 to the fuel cell stack 92. The first hydrogen pipe 96A is disposed between the outer panel 20B1 and the inner panel 20B2, and between the panel and the interior material that structure the side wall portion 20D. Note that the portion of the first hydrogen pipe 96A, which portions extends in the vehicle vertical direction at the side wall portion 20D side, is positioned between a front end 24A1 and a rear end 24A2 of the front wheel 24A as seen in a side view.

The second hydrogen pipe 96B connects the lower tank case 91B and the fuel cell stack 92. This second hydrogen pipe 96B supplies hydrogen that is within the hydrogen tanks 90 to the fuel cell stack 92, and supplies hydrogen, which is poured-in from a fill port 95 that is described later, to the hydrogen tanks 90 of the lower tank case 91B. The second hydrogen pipe 96B is disposed beneath the floor of the vehicle cabin 20.

The third hydrogen pipe 96C connects the upper tank case 91A and the fill port 95 that is provided at the vehicle rear portion of the side wall portion 20D. The third hydrogen pipe 96C supplies hydrogen, which is injected-in from the fill port 95, to the hydrogen tanks 90 of the upper tank case 91A and to the hydrogen tanks 90 of the lower tank case 91B. The third hydrogen pipe 96C is disposed between the outer panel 20B1 and the inner panel 20B2, and in the gap between the panel and the interior material that structure the side wall portion 20D. Note that the portion of the third hydrogen pipe 96C, which portions extends in the vehicle vertical direction at the side wall portion 20D side, is positioned between a front end 24B1 and a rear end 24B2 of the rear wheel 24B as seen in a side view.

The side entrance/exit 27 of a size through which adult passengers can walk and enter into and exit from the vehicle 10 is provided in the side wall portion 20D that is at a vehicle side (the vehicle transverse direction left side) of the vehicle cabin 20. This side entrance/exit 27 is closed-off by a sliding door 27A that is slidably fixed to the vehicle front side. Further, as shown in FIG. 2, a side ramp 28, which extends at a downward incline from the low floor portion 20A1 toward the sidewalk (or the roadway), is provided at the side entrance/exit 27. When the vehicle 10 is traveling, the side ramp 28 is accommodated in a side accommodating portion 28A that is provided in the gap between the floor panel 21 and the hydrogen tank case 91 (see FIG. 3). In the state of usage in which passengers are entering into or exiting from the vehicle 10 thereon, the side ramp 28 is pulled-out toward the side of the vehicle from the side accommodating portion 28A.

Manufacturing Method

In the present embodiment, first, the center module 16, the front module 17 and the rear module 18 are respectively manufactured. For example, at the center module 16, the roof 20B at the vehicle central portion, the side wall portions 20D at the vehicle central portion, the floor panel 21, and the center side members 14A and the like are assembled together. Further, the upper tank case 91A is fixed to the outer panel 20B1 or the inner panel 20B2, and the lower tank case 91B is fixed to the center side members 14A.

Further, at the front module 17, the front wall portion 20C, the roof 20B at the vehicle front portion, the side wall portions 20D at the vehicle front portion, the dash panel 23B, the front side members 14B, and the front wheels 24A and the like are assembled together. Further, the autonomous driving unit 40, the fuel cell stack 92 and the secondary battery 93 are fixed to the interior of the subunit chamber 22C. Moreover, at the rear module 18, the rear wall portion 20E, the roof 20B at the vehicle rear portion, the side wall portions 20D at the vehicle rear portion, the rear side members 14C, the dash panel 23A, and the rear wheels 24B and the like are assembled together. Further, the driving unit 32 and the power unit 34 are fixed to the power unit chamber 22A.

Then, the front module 17 and the rear module 18 are joined to the center module 16. At the time of joining the respective modules, the autonomous driving unit 40 and the respective sensors 42 are connected by the signal cable 46.

Further, the fuel cell stack 92 and the power unit 34 are connected by the power cable 36. Namely, the fuel cell stack 92 and the driving unit 32 are electrically connected. Moreover, the first hydrogen pipe 96A and the third hydrogen pipe 96C are connected to the upper tank case 91A, and the second hydrogen pipe 96B is connected to the lower tank case 91B. Due thereto, the respective hydrogen tanks 90 and the fuel cell stack 92 are connected, and the respective hydrogen tanks 90 and the fill port 95 are connected.

Modified Example of First Embodiment

Figure 6:
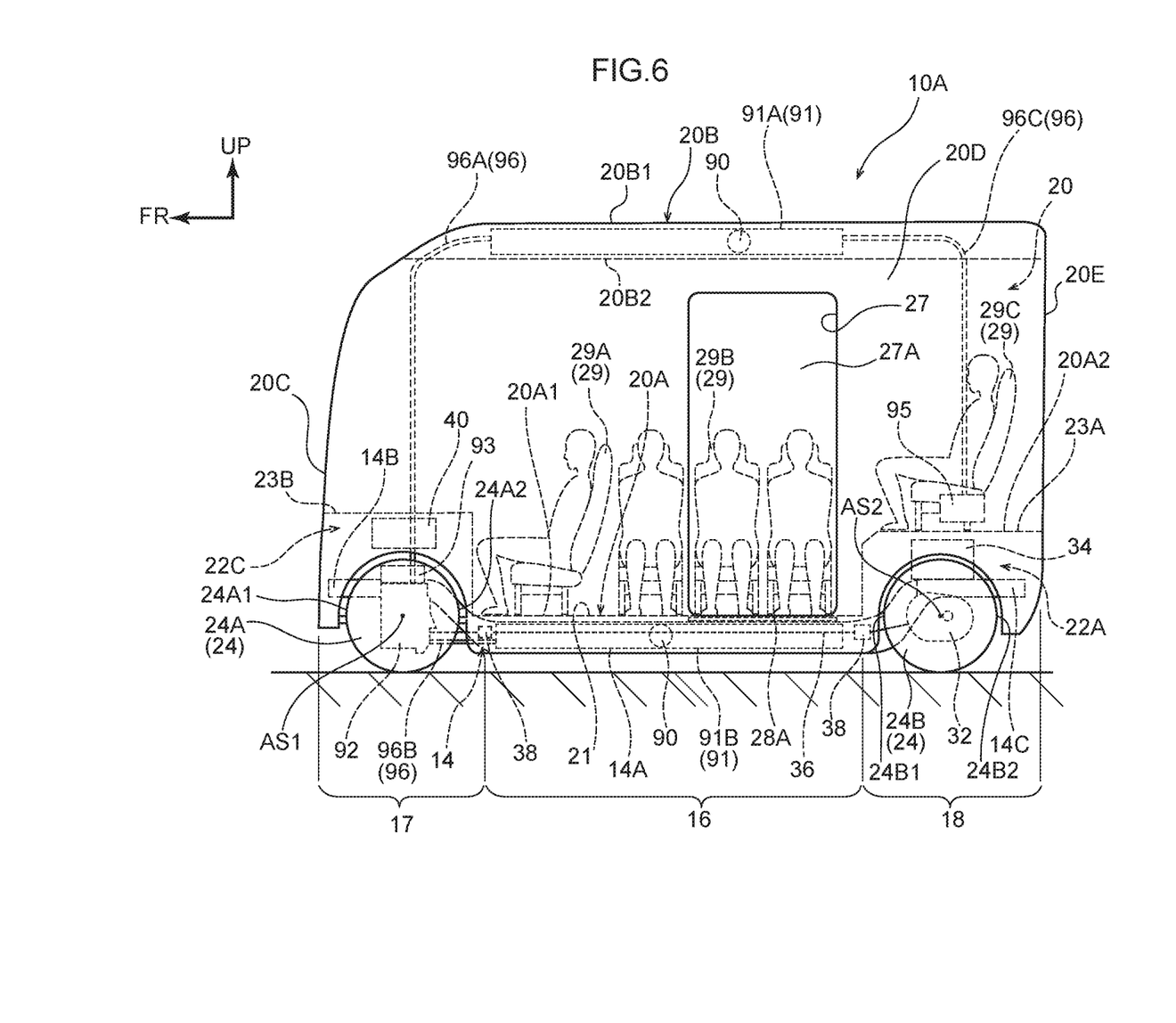
FIG. 6 is a side view of a fuel cell vehicle relating to a modified example of the first embodiment.

The vehicle 10 of the present embodiment is structured by the plural modules being joined together. The size of the vehicle 10 and the area of the vehicle cabin 20 can be changed by changing the length of the center module 16 that is at the vehicle central portion. For example, as shown in FIG. 6, in a vehicle 10A of a modified example of the present embodiment, the center module 16 is shortened, and the vehicle longitudinal direction length thereof is formed to be short as compared with the vehicle 10 of the present embodiment. Note that, in the vehicle 10A of the present modified example, one of the middle row seats 29B is omitted due to the vehicle longitudinal direction length of the vehicle cabin 20 being shortened.

Figure 7:
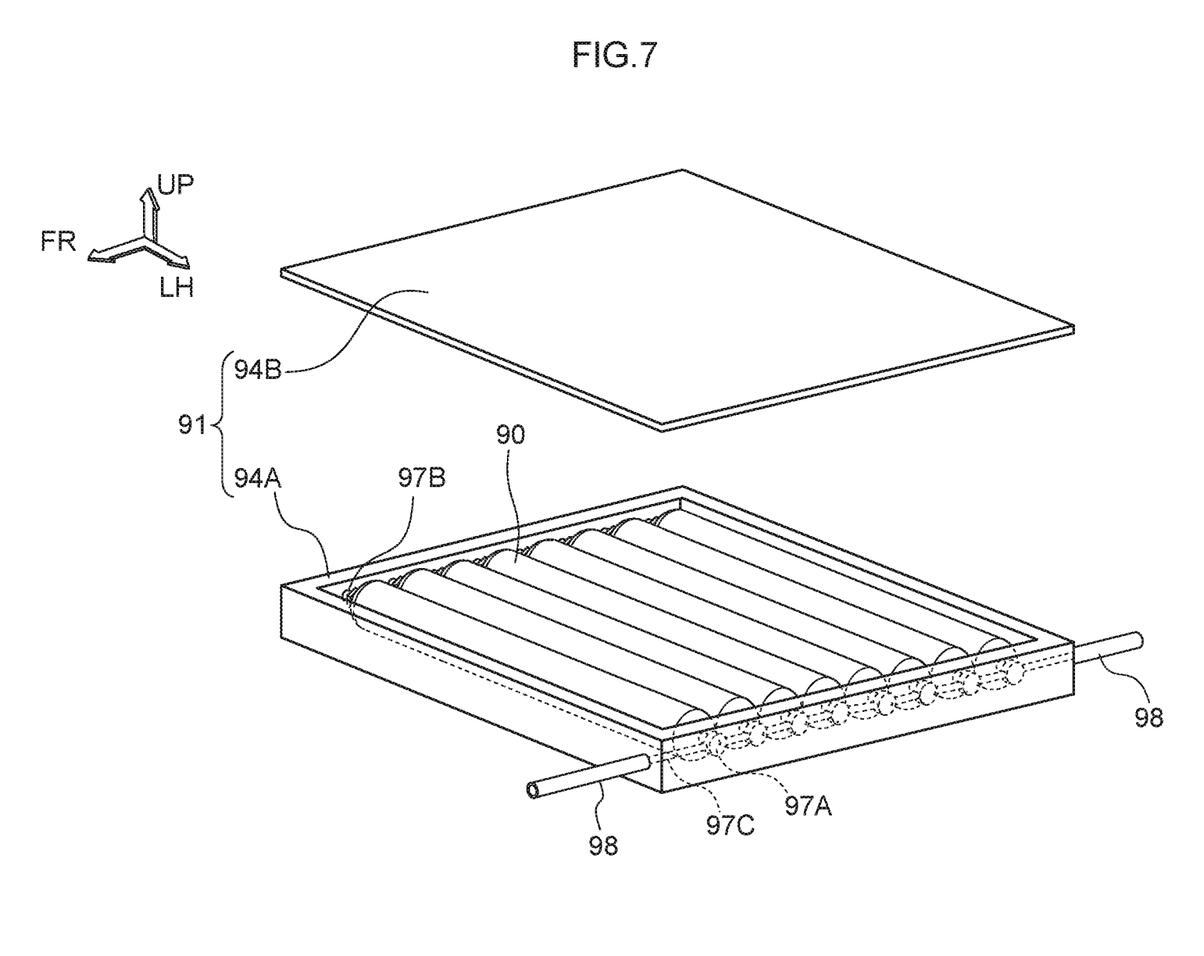
FIG. 7 is a perspective view of the hydrogen tanks and the hydrogen tank case of the fuel cell vehicle relating to the modified example of the first embodiment.

As shown in FIG. 7, at the hydrogen tank case 91 of the present modified example, eight of the hydrogen tanks 90 are disposed so as to be lined-up in the vehicle longitudinal direction. Namely, at the hydrogen tank case 91 of the present modified example, by reducing the number of hydrogen tanks 90 that are housed therein, the vehicle longitudinal direction length of the hydrogen tank case 91 is adjusted. In the present modified example as well, the mouthpieces 98 that are connected to the end portions of the connecting pipe 97C respectively are provided so as to project-out at the vehicle longitudinal direction both sides of the hydrogen tank case 91.

Overview of First Embodiment

The vehicle 10 of the present embodiment is manufactured by plural modules being combined together. Here, the hydrogen tank cases 91 that are accommodated in the center module 16 have the mouthpieces 98 for the connecting of the hydrogen pipes 96 in the vehicle longitudinal direction. Therefore, the fuel cell stack 92 and the fill port 95 can be provided at either of the front module 17 or the rear module 18.

In the vehicle 10 of the present embodiment, the structural devices, which are the fuel cell stack 92, the secondary battery 93, the driving unit 32 and the power unit 34, are disposed so as to be divided between the front module 17 and the rear module 18. Further, the pair of hydrogen tank cases 91 of the hydrogen tanks 90 that are used in common are disposed at the center module 16 at the roof 20B side and the side beneath the floor. Namely, in accordance with the present embodiment, a wide vehicle cabin space can be ensured, while the hydrogen tanks 90 that are used in common are utilized and the vehicle is modularized.

In particular, at the center module 16 of the present embodiment, the fuel cell stack 92, the secondary battery 93, the driving unit 32 and the power unit 34 are not provided, and the hydrogen tanks 90 are provided at the roof 20B side and the underfloor side. Due thereto, in the present embodiment, the surface area of the low floor portion 20A1 can be maximized, and a sufficient amount of hydrogen can be loaded into the vehicle 10 while the space of the vehicle cabin 20 is maximized. Namely, the operating time of the vehicle 10 can be ensured, and the traveling range can be increased.

Further, in the vehicle cabin 20 of the present embodiment, adult passengers can assume standing postures, and can walk around. Because the vehicle 10 of the present embodiment is a completely autonomous-driving vehicle, it is not absolutely necessary to provide a driver's seat, and the layout of the vehicle cabin 20 interior can be set freely. Namely, in accordance with the present embodiment, equipment corresponding to applications such as ride sharing, lodging, restaurants, retail shops and the like can be accommodated in a flat and wide space that is due to the low floor, box-shaped, barrier-free design. Further, the vehicle 10 of the present embodiment is suitable as a autonomous-driving bus.

The plural hydrogen tanks 90 are accommodated in states of being consolidated, within the hydrogen tank cases 91 of the present embodiment. Therefore, in accordance with the hydrogen tank cases 91 of the present embodiment, at the time when the vehicle 10 is involved in a collision, the hydrogen tanks 90 being damaged by impact can be suppressed.

In the present embodiment, the power cable 36 is connected via the power connectors 38 at the joined portion of the center module 16 and the front module 17, and at the joined portion of the center module 16 and the rear module 18. Due thereto, the fuel cell stack 92 and the driving unit 32 (the power unit 34) are electrically connected. Further, at the joined portion of the center module 16 and the front module 17, the upper tank case 91A and the fuel cell stack 92 are connected, and the lower tank case 91B and the fuel cell stack 92 are connected.

On the other hand, as shown in the above-described modified example, the hydrogen tank case 91 can be shortened in the vehicle longitudinal direction by reducing the number of the hydrogen tanks 90 that are arrayed therein. Namely, even if the common hydrogen tanks 90 are used, correspondence with the length of the center module 16 can be achieved.

As described above, in accordance with the structure of the present embodiment, even if the center module 16 is lengthened or shortened, the same front module 17 and rear module 18 can be joined thereto. Namely, the center modules 16 that have different lengths in the vehicle longitudinal direction can be prepared for the front module 17 and the rear module 18 that are the same of those of the present embodiment. Therefore, it is possible to change the sizes of the vehicles. Due thereto, an increase in the manufacturing cost can be suppressed.

Further, in the vehicle 10 of the present embodiment, the fuel cell stack 92 that generates electric power and the secondary battery 93 that stores electric power are disposed at the front module 17, and the power unit 34 that controls electric power and the driving unit 32 that uses electric power are disposed at the rear module 18. Namely, in accordance with the present embodiment, because the respective devices are disposed so as to run along the flow of the electric current, the length of the power cable 36 can be shortened, and the weight of the vehicle 10 can be lightened. Further, in the present embodiment, the fuel cell stack 92 and the driving unit 32 that are heavy objects are disposed separately at the front module 17 and at the rear module 18. Therefore, the weight balance of the vehicle 10 of the present embodiment can be improved, and the driving performance can be improved.

Further, in the present embodiment, the devices that are disposed in the rear module 18 are used in common for both fuel cell vehicles and electric automobiles. Namely, in accordance with the present embodiment, the rear module 18 can be used in common at fuel cell vehicles and electric automobiles.

In the present embodiment, at the first hydrogen pipe 96A that connects the upper tank case 91A and the fuel cell stack 92, the portion that extends in the vehicle vertical direction is positioned between the front end 24A1 and the rear end 24A2 of the front wheel 24A as seen in a side view. Further, at the third hydrogen pipe 96C that connects the upper tank case 91A and the fill port 95, the portion that extends in the vehicle vertical direction is positioned between the from end 24B1 and the rear end 24B2 of the rear wheel 24B as seen in a side view. In accordance with the present embodiment, as shown in FIG. 3 for example, in a case in which the vehicle 10 is collided-with from the side (the vehicle transverse direction) by another vehicle V or a pole P, the wheels 24 receive the impact load, and therefore, the structure for protecting the respective hydrogen pipes 96 can be simplified.

At the side entrance/exit 27 of the present embodiment, the side ramp 28 can be provided from the low floor portion 20A1 toward the sidewalk. Namely, in accordance with the present embodiment, by eliminating the step between the road surface and the floor surface of the vehicle cabin, entry and exit while in a wheelchair, and the work of loading and unloading luggage and dollies, can be carried out easily. Note that an elevator may be set at the side entrance/exit 27 instead of the ramp.

Second Embodiment

A vehicle 100 of a second embodiment differs from the first embodiment with regard to the point that, in addition to the driving unit 32 and the power unit 34, the fuel cell stack 92 and the secondary battery 93 are disposed at the vehicle rear side of the vehicle 100. Description hereinafter centers around the points that differ from the first embodiment. Note that structures that are the same as those of the first embodiment are denoted by the same reference numerals.

Figure 8:
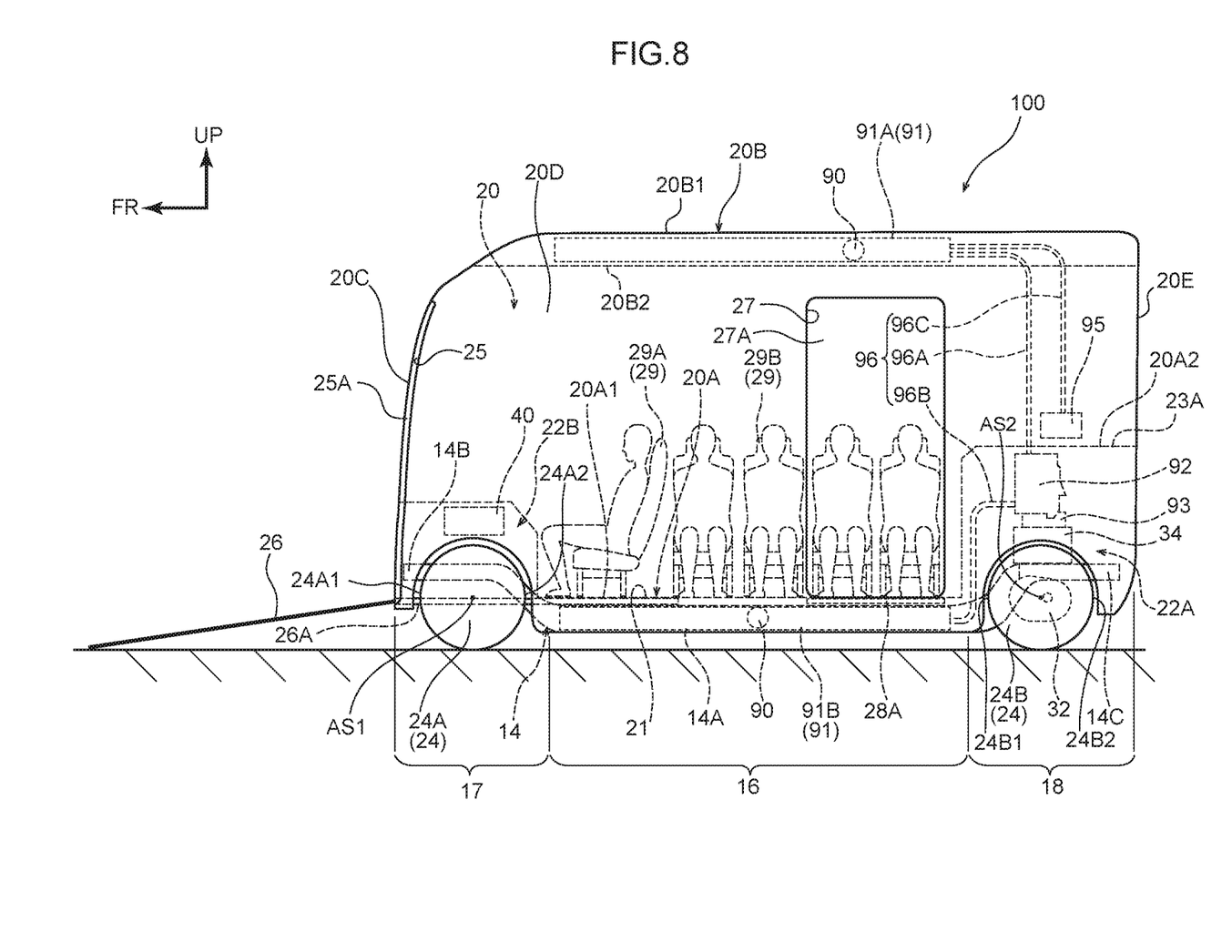
FIG. 8 is a side view of a fuel cell vehicle relating to a second embodiment.

As shown in FIG. 8, the power unit chamber 22A of the present embodiment projects-out further toward the vehicle upper side than in the first embodiment, and the seats 29 are not provided at the upper portion of the power unit chamber 22A. The driving unit 32, the power unit 34, the secondary battery 93 and the fuel cell stack 92 are disposed in the power unit chamber 22A in that order from the vehicle lower side.

The first hydrogen pipe 96A and the second hydrogen pipe 96B are connected from the vehicle front side to the fuel cell stack 92 that is disposed in the power unit chamber 22A. Here, at the upper tank case 91A, the mouthpiece 98 that is at the vehicle front side is closed-off. Further, the mouthpiece 98 that is at the vehicle rear side of the upper tank case 91A is forked in two. The first hydrogen pipe 96A is connected to one section thereof, and the third hydrogen pipe 96C is connected to the other section thereof. Further, at the lower tank case 91B, the mouthpiece 98 that is at the vehicle front side is closed-off, and the second hydrogen pipe 96B is connected to the mouthpiece 98 that is at the vehicle rear side.

The first hydrogen pipe 96A, the second hydrogen pipe 96B and the third hydrogen pipe 96C are connected to the respective mouthpieces 98 at the time of joining the rear module 18 to the center module 16. The fill port 95 is provided at the same side as the fuel cell stack 92 in the vehicle longitudinal direction, i.e., at the vehicle rear portion.

Further, the vehicle cabin 20 has a protruding portion 22B that protrudes-out toward the vehicle transverse direction inner side at the vehicle front portion of the vehicle cabin 20. This protruding portion 22B structures a portion of the wheel house that accommodates the front wheel 24A. The autonomous driving unit 40 is housed in the space that is adjacent to the wheel house. The vehicle cabin 20 of the present embodiment does not have the sub-unit chamber 22C, and the low floor portion 20A1 that is flat is formed by the floor panel 21 whose vehicle front side is flat from the power unit chamber 22A.

A front entrance/exit 25, which is an end portion entrance/exit through which adult passengers can walk and enter into and exit from the vehicle, is provided in the front wall portion 20C that is at the vehicle front side of the vehicle cabin 20. This front entrance/exit 25 is closed-off by a hinged door 25A whose vehicle transverse direction one end is fixed so as to be able to rotate. Further, a front ramp 26, which serves as an end portion ramp and extends at a downward incline from the low floor portion 20A1 toward the roadway, is provided at the front entrance/exit 25. When the vehicle 100 is traveling, the front ramp 26 is accommodated in a front accommodating portion 26A that is provided at the lower portion of the floor panel 21. In the state of usage in which passengers are entering into or exiting from the vehicle 100 thereon, the front ramp 26 is pulled-out toward the front of the vehicle from the front accommodating portion 26A.

Note that, as seen in a plan view, the side accommodating portion 28A is formed at position beneath the floor that does not overlap with the front accommodating portion 26A and is apart from the front accommodating portion 26A. Namely, as seen in a plan view, the side ramp 28 does not overlap with the front ramp 26, and is accommodated at a position removed therefrom.

Overview of Second Embodiment

In the vehicle 100 of the present embodiment, the main devices thereof are disposed toward the vehicle lower side of the vehicle rear portion, and the front entrance/exit 25 is provided at the front wall portion 20C that is at the vehicle front side. Due thereto, the vehicle cabin 20 is formed from the vehicle front end portion to the vehicle rear end portion.

Further, the vehicle 100 of the present embodiment can be accessed from the roadway due to the front entrance/exit 25 being provided at the vehicle front side, and, in addition to the roadway, can be accessed from the sidewalk due to the side entrance/exit 27 being provided at the vehicle side.

At the front entrance/exit 25, the front ramp 26 can be provided from the low floor portion 20A1 toward the roadway. Further, in the same way as in the first embodiment, at the side entrance/exit 27, the side ramp 28 can be provided from the low floor portion 20A1 toward the sidewalk. Namely, in accordance with the present embodiment, by eliminating the step between the road surface and the floor surface of the vehicle cabin, entry and exit while in a wheelchair, and the work of loading and unloading luggage and dollies, can be carried oat easily. In particular, in the present embodiment, due to the entrances/exits being provided at two places which are at the front surface and a side surface of the vehicle 100, entry and exit while in a wheelchair, and the work of loading and unloading luggage and dollies, can be carried out easily on the roads that the vehicle 100 can pass along, regardless of the absence/presence of sidewalks that have a step. Note that elevators may be set at the front entrance/exit 25 and the side entrance/exit 27 instead of the ramps.

In the present embodiment, as seen in a plan view, the front ramp 26 and the side ramp 28 are accommodated at positions that do not overlap, in states of being apart from one another. Here, if the front ramp 26 and the side ramp 28 were to be accommodated at positions that overlap as seen in a plan view, there would be the need to raise the low floor portion 20A1, or to reduce the vehicle vertical direction heights of the hydrogen tank cases 91 that house the hydrogen tanks 90 and of the center side members 14A. In contrast, in accordance with the vehicle 100 of the present embodiment, because the side ramp 28 is accommodated at a position that does not overlap the front ramp 26 and in a state of being apart therefrom as seen in a plan view, lowering of the low floor portion 20A1 and increasing of the volume of the hydrogen tank cases 91 can both be realized.

Further, in the vehicle 100 of the present embodiment, the autonomous driving unit 40 and the respective sensors 42 are disposed at the vehicle front portion and the vehicle upper portion, and the fuel cell stack 92, the secondary battery 93, the power unit 34 and the driving unit 32 are disposed at the vehicle rear portion. Namely, in the present embodiment, the autonomous driving unit 40 and the sensors 42 that relate to autonomous driving are disposed so as to be set apart from the fuel cell stack 92, the secondary battery 93, the power unit 34 and the driving unit 32 that are motive power parts through which high-voltage current flows. In accordance with the present embodiment, influence of electromagnetic noise, generated from the motive power parts, on the autonomous driving unit 40 and the sensors 42 can be reduced. Further, in the present embodiment, because the first hydrogen pipe 96A and the third hydrogen pipe 96C are consolidated at the vehicle rear portion, there is no need to provide a space for pipes at the vehicle front portion, and the space of the vehicle cabin 20 can be ensured.

Further, as shown in FIG. 5, the signal cable 46 that connects the autonomous driving unit 40 and the respective sensors 42 is disposed from the vehicle front side toward the vehicle upper side, and the signal cable 46 also is disposed so as to be apart from the motive power parts. Namely, in accordance with the present embodiment, by setting the signal cable 46, which is easily affected by noise, far apart from the motive power parts, influence of electromagnetic noise, generated from the motive power parts, on the control signals of the autonomous driving can be reduced.

Third Embodiment

A vehicle 110 of a third embodiment differs from the first embodiment with regard to the point that the fill port 95 is disposed at the vehicle front portion. Description centers around the points that differ from the first embodiment. Note that structures that are the same as those of the first embodiment are denoted by the same reference numerals.

Figure 9:
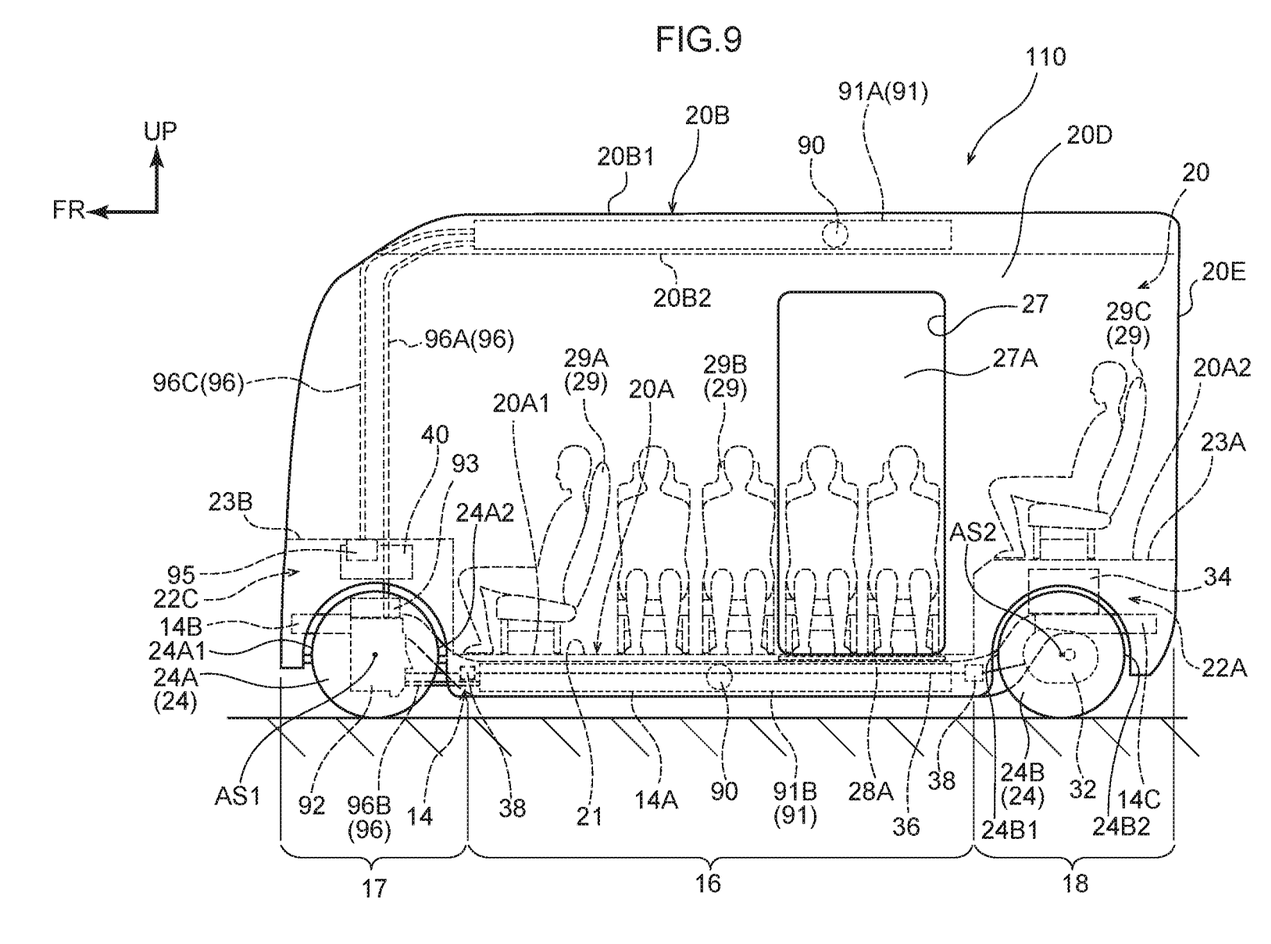
FIG. 9 is a side view of a fuel cell vehicle relating to a third embodiment.

As shown in FIG. 9, in the vehicle 110 of the present embodiment, the fill port 95 is provided at the side wall portion 20D of the vehicle front portion. The fill port 95 is provided at the same side as the fuel cell stack 92 in the vehicle longitudinal direction, i.e., at the vehicle front portion. The mouthpiece 98 that is at the vehicle front side of the upper tank case 91A is forked-off into two. The first hydrogen pipe 96A is connected to one section, and the third hydrogen pipe 96C is connected to the other section. Further, at the upper tank case 91A, the mouthpiece 98 that is at the vehicle rear side is closed-off.

As described above, in accordance with the vehicle 110 of the present embodiment, effects that are similar to those of the vehicle 10 of the first embodiment are obtained. Further, in the present embodiment, because the first hydrogen pipe 96A and the third hydrogen pipe 96C are consolidated at the vehicle front portion, there is no need to provide a space for pipes at the vehicle rear portion, and the space of the vehicle cabin 20 can be ensured.

Supplemental Explanation

Although the above-described respective embodiments are completely autonomous-driving vehicles that do not have a driver's seat, the present disclosure is not limited to this, and may be a autonomous-driving vehicle that has a driver's seat. Namely, in the respective embodiments, autonomous driving can be carried out usually, and manual driving can be made possible at time of avoiding danger or at arbitrary times. Note that, by providing the driver's seat at a vehicle transverse direction one side of the vehicle front portion, the front entrance/exit 25 can be provided at the vehicle transverse direction other side of the front wall portion 20C.

Although the vehicles of the respective embodiments are vehicles that have been modularized, they may be vehicles that are manufactured by the assembling of parts, and not be modularized. Here, in cases of manufacturing vehicles of different sizes, for example, vehicles of different vehicle longitudinal direction lengths can be easily manufactured by preparing the center side members 14A, the side wall portions 20D, the floor panels 21, the hydrogen tank cases 91 and the like that have differing length dimensions.

Note that the vehicles of the respective embodiments may be formed oppositely in the vehicle longitudinal direction. Using the first embodiment as an example, the driving unit 32 and the power unit 34 can be disposed at the vehicle front portion, and the fuel cell stack 92 and the secondary battery 93 can be disposed at the vehicle rear portion.

Further, there is no need for the hydrogen tank cases 91 (the hydrogen tanks 90) to be set over the entire vehicle central portion region. For example, the hydrogen tank case 91 whose vehicle longitudinal direction length is shorter than the center module 16 may be prepared, and the center of gravity position of the vehicle can be adjusted by changing the accommodated position.

What is claimed is:

1. A vehicle structure of a fuel cell vehicle, comprising:
   hydrogen tanks that are disposed at a roof side and an underfloor side of a vehicle cabin, and that are filled with hydrogen;
   a set of cases that house the hydrogen tanks at the roof side and the underfloor side respectively, and that respectively have, in a vehicle longitudinal direction, mouthpieces of a connecting pipe that is connected to the hydrogen tanks;
   a center module in which the set of cases is provided;
   a front module that is joined to a vehicle front side of the center module;
   a rear module that is joined to a vehicle rear side of the center module;
   a fuel cell stack that is provided at the front module or the rear module, and to which the hydrogen is supplied from a pipe connected to the mouthpieces;
   a control unit that is provided at the front module or the rear module, and that controls outputted electric power of the fuel cell stack; and
   a driving unit that is provided at the front module or the rear module, and that drives driving wheels by outputted electric power of the control unit.

2. The vehicle structure of a fuel cell vehicle of claim 1, wherein positions, in the vehicle longitudinal direction, of extended portions, which extend in a vehicle vertical direction, of the pipes are within a range between a front end and a rear end of a wheel.

3. The vehicle structure of a fuel cell vehicle of claim 1, wherein:
   high-voltage parts including the fuel cell stack, the control unit and the driving unit are provided at one of the from module or the rear module, and
   the vehicle structure further comprises an autonomous driving unit that controls autonomous driving of the vehicle, at another of the front module or the rear module.

4. The vehicle structure of a fuel cell vehicle of claim 1, wherein:
   the hydrogen tanks are shaped as tubes whose lengths run in a vehicle transverse direction, and
   a plurality of the hydrogen tanks are disposed along the vehicle longitudinal direction at interiors of the cases.

5. The vehicle structure of a fuel cell vehicle of claim 1, wherein:
   the fuel cell stack, the control unit and the driving unit are disposed at one of the front module or the rear module, and
   an end portion entrance/exit through which passengers can enter and exit is disposed at a wall portion of another of the front module or the rear module.

6. The vehicle structure of a fuel cell vehicle of claim 1, further comprising a filling port that is disposed at a same side as the fuel cell stack in the vehicle longitudinal direction, and that is for filling hydrogen.

* * * * *

UNITED STATES PATENT AND TRADEMARK OFFICE
CERTIFICATE OF CORRECTION

PATENT NO. : 10,870,361 B2
APPLICATION NO. : 16/539304
DATED : December 22, 2020
INVENTOR(S) : Yasuhiro Hara and Mikio Inoue Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 3, Line(s) 31, delete "direction".

In Column 3, Line(s) 51, delete "time" and insert --the--, therefor.

In Column 6, Line(s) 56, delete "libel" and insert --fuel--, therefor.

In Column 7, Line(s) 56, delete "subunit" and insert --sub-unit--, therefor.

In Column 9, Line(s) 13, delete "low floor" and insert --low-floor--, therefor.

In Column 10, Line(s) 14, before "end", delete "from" and insert --front--, therefor.

In Column 11, Line(s) 62, after "carried", delete "oat" and insert --out--, therefor.

In the Claims

In Column 14, Line(s) 28, Claim 3, delete "from" and insert --front--, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*